DISCRIMINATOR CIRCUIT

Filed Feb. 23, 1956

INVENTORS
JAMES POLYZOU
JOHN H. BRUNDAGE
BY Alfred C. Hill
AGENT

United States Patent Office 2,906,873

Patented Sept. 29, 1959

2,906,873

DISCRIMINATOR CIRCUIT

James Polyzou, Nutley, and John H. Brundage, West Caldwell, N.J., assignors to International Telephone and Telegraph Corporation, Nutley, N.J., a corporation of Maryland Application February 23, 1956, Serial No. 567,112

4 Claims. (Cl. 250—27)

This invention relates to discriminator circuits and more particularly to an improved frequency discriminator circuit.

Frequency discriminator circuits are useful in detecting frequency modulation signals and in detecting frequency errors in automatic frequency control systems. This type of discriminator is also used in connection with two-tone signaling, frequency shift telegraphy, or similar telemetering applications in which "on-off," "mark-space," or "make-break" information is transmitted using two single frequency tones which each represent one of the conditions.

Discriminators, and particularly frequency discriminators, are known in the prior art. The Foster-Seeley type discriminator and what may be termed the pass band type discriminator are examples of the prior art discriminators. These prior art discriminators have at least one of the following disadvantages: (1) difficulty in tuning the circuit to the frequency desired, (2) difficulty in controlling the shape of the discriminator characteristic, (3) lack of good symmetry about the zero or cross-over point, (4) interaction between the tuned circuits is a critical parameter, (5) not suited to operation at narrow bandwidths, and (6) the "Q" of the tuned circuit is affected by source and/or load impedances.

Therefore, it is an object of this invention to provide a frequency discriminator substantially overcoming the above-mentioned disadvantages.

The discriminator of this invention is provided for use in two-tone signaling, frequency shift telegraphy, or similar telemetering applications where the information is transmitted using two single frequency tones which each represent one of two conditions. The discriminator responds to the two conditions to generate either a positive or negative voltage at its output. Although the circuit explanation which is contained in this specification is based on these applications, it is to be understood that the discriminator of this invention may also be employed in other applications which require a frequency discriminator such as detecting frequency modulation signals and detecting frequency errors in automatic frequency control systems.

Another object of this invention is to provide a frequency discriminator operating on a frequency rejection principle rather than a pass band principle.

Still another object of this invention is to provide a frequency discriminator operating on a frequency rejection principle utilizing dissipation compensated resonant elements therein.

A feature of this invention is the provision of a frequency discriminator comprising a signal input means, a first signal channel and a second signal channel coupled in parallel to said input means and a resonant element disposed in each of said channels. Each of the resonant elements is resonant at different frequencies and operates to reject the frequency at which it is resonant. The outputs of the channels are combined in opposition to provide the desired frequency discrimination characteristic.

Another feature of this invention is the provision of dissipation compensated rejection filters in each of the channels of the frequency discriminator resonant at different frequencies and operating to reject the frequency at which it resonates.

Still another feature of this invention is the provision of a bridge circuit for each of said channels connected to provide a reference potential to rectify the output signals of their respective resonant elements and to cooperate in combining these outputs in opposition to provide the desired frequency discrimination characteristic.

The above-mentioned and other features and objects of this invention will become more apparent by reference to the following description taken in conjunction with the accompanying drawings, in which.

Figure 1:
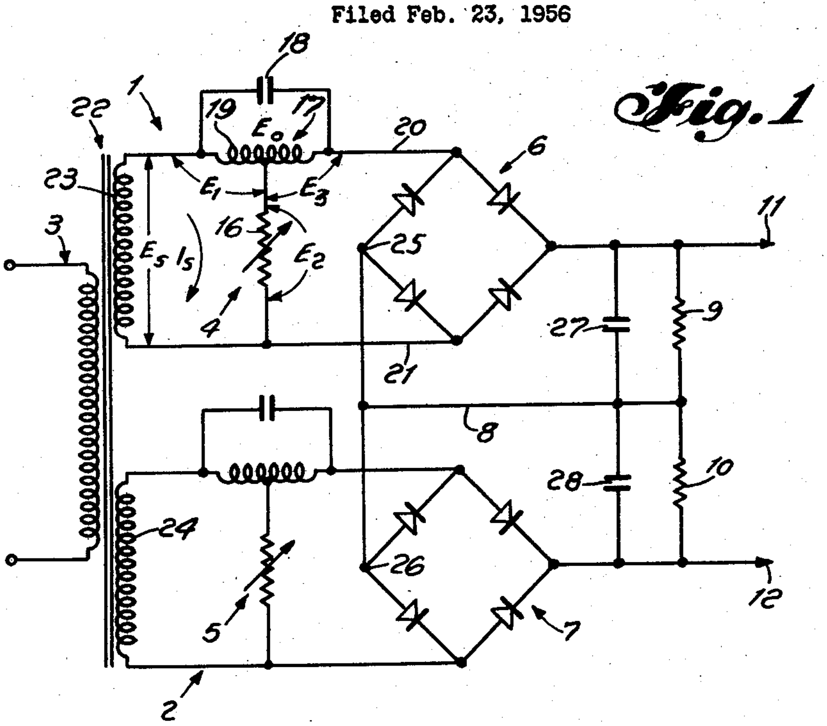
Fig. 1 illustrates a schematic diagram of an embodiment of this invention.

Referring to Fig. 1, the discriminator is illustrated as including two signal channels 1 and 2 fed from a common input means 3. Each channel contains a resonant element 4 and 5, respectively, which will pass all frequencies except those in the region of resonance. The output of each channel is rectified by means of bridges 6 and 7, respectively, to produce a D.C. voltage. The bridges 6 and 7 are tied to a common point as illustrated at 8, and the respective outputs of bridges 6 and 7 are coupled to their load resistors 9 and 10 which effectively combine the output signals of bridges 6 and 7 in opposition. The resultant descrimination characteristic thereby results, the output of the discriminator being removed from terminals 11 and 12.

Figure 2:
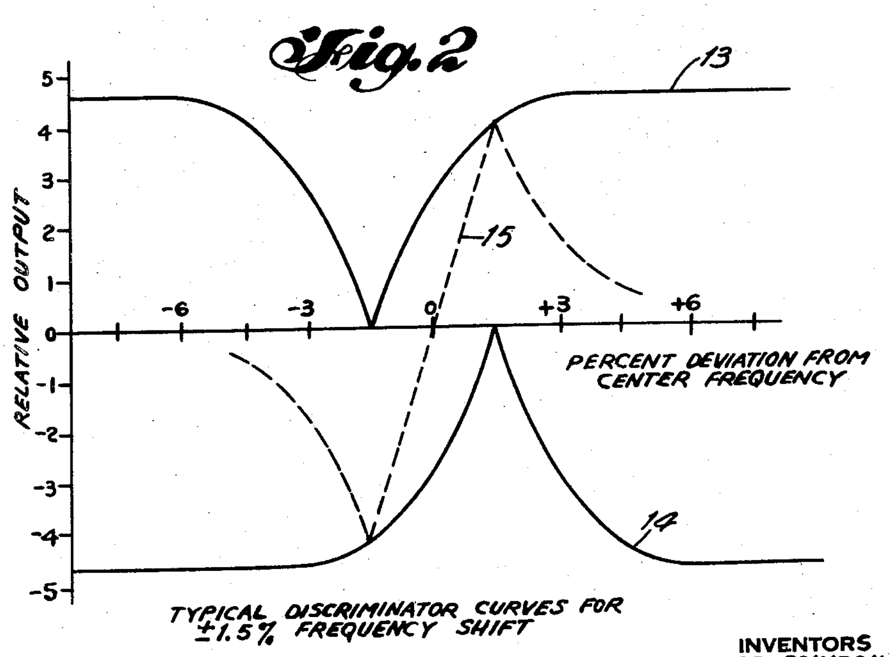
Fig. 2 illustrates a set of curves useful in understanding the operation of the circuit of Fig. 1.

The output paths 1 and 2 are identical in configuration, except that one path resonates at a frequency $f_1$, which may correspond to one condition of a two-tone signaling, frequency shift telegraphy, or similar telemetering application or one peak of a frequency discrimination curve desired in the detection of frequency modulation. The second path is resonated at a frequency $f_2$, corresponding to a second condition of the two-condition transmitting systems as mentioned above or the other peak of the discrimination characteristic desired for detecting frequency modulation or frequency errors. The outputs of the two paths 1 and 2 are connected in opposition as mentioned above so that at frequencies away from resonance they are equal and opposite and therefore cancelled. At or near resonance, however, the voltage balance no longer exists, and either a positive or negative voltage output will be developed. This effect is illustrated in Fig. 2 in which curve 13 respresents the output of one path and curve 14 represents the output of the other path. The resultant combined output voltage as is present across terminals 11 and 12 is illustrated by the dotted curve 15. It is obvious from the foregoing that the resonant elements of the discriminator function as rejection filters rather than pass filters. A distinct advantage of the rejection filter is that several variations of such filters in which the effects of coil dissipation may be balanced out by relatively simple methods may be used in this application to allow results which otherwise could only be obtained by the use of very high "Q" resonant circuits. Because of the high effective "Q" of the circuits, it is possible to tune the resonant circuits to a very high degree of accuracy without elaborate equipment. It is further possible to achieve a relatively linear discrimination characteristic between the different resonant frequencies present in the two signal paths. Since maximum power appears at the load in the off-resonance condition, this type of discriminator can operate at high efficiencies even under heavy loads.

Let us consider resonant element 4 in detail. A description of resonant element 4 will hold also for resonant element 5 since they have substantially the same configuration, the only difference existing in the frequency at which they resonate. Resonant element 4 is a simple resonant circuit in which the effects of dissipation may be balanced out with the aid of resistor 16. Assuming the frequency of the input means 3 is exactly the same as the resonant frequency of inductor 17 and condenser 18, the current $I_s$ from the generator will flow through a portion 19 of inductor 17 and through resistor 16, causing voltage drops $E_1$ and $E_2$ to be developed respectively across the inductor and resistor. The voltage $E_1$ appearing across the tapped portion of the inductor 17 will be dependent on the "Q" of the resonant circuit and on the value of resistor 16. By induction, the voltage $E_3$ will be developed across the remaining portion of the coil 17. Since at resonance the tuned circuit appears resistive, $E_2$ and $E_3$ are in phase and by adjusting resistor 16 it is possible to make voltage $E_3$ exactly equal to voltage $E_2$ with reference to the coil tap $E_0$, and hence the inputs 20 and 21 to the bridge circuit 6 become equal potential points and no current may flow to the bridge 6. As the input frequency is moved away from resonance, $E_2$ approaches $E_s$ in magnitude; hence, away from resonance the voltage appearing across bridge 6 is substantially $E_s$ and maximum current will flow through bridge 6.

As illustrated in Fig. 1, the discriminator of this invention is constructed of two such dissipation balanced rejection filters. The input signal is coupled to input means 3, the primary winding of transformer 22. The secondary windings 23 and 24 of transformer 22 deliver equal voltages to the resonant elements, rejection filters, 1 and 2. Rejection filter 1 may be resonant at frequency $f_1$ and rejection filter 2 may be resonant at frequency $f_2$. The outputs of the two rejection filters or resonant elements are connected to rectifier bridges 6 and 7, respectively. The negative terminals 25 and 26 of the two bridges are connected together at 8. Capacitors 27 and 28 serve as filters for the rectified outputs of bridges 6 and 7, respectively, and resistors 9 and 10 serve as loads for the respective rectifiers.

With voltage referred to the common connecting bus between the two circuit halves, curve 13 of Fig. 2 illustrates the voltage developed across load resistor 9 as a function of frequency. Curve 14 of Fig. 2 illustrates the voltage developed across resistor 10 as a function of frequency. The combined voltage across resistors 9 and 10, the combined output between terminals 11 and 12, is the resultant discriminator output and is illustrated by curve 15 of Fig. 2.

The difference between $f_1$ and $f_2$ is chosen for a particular application and has no limitation as to the maximum difference. The minimum difference may place $f_1$ and $f_2$ very close to each other and is limited only by the smallness of the value of the inductors. The linearity of curve 15 is determined by the value of the inductors of elements 1 and 2 and the "Q" of these inductors. The slope of curve 15 and the deviation capable of being handled is determined by the frequency difference between $f_1$ and $f_2$.

The discriminator hereinabove described has the advantage of providing extremely accurate tuning and, hence, a high degree of reproducibility in production. It provides easily controlled shape of the discriminator output curve and has good symmetry and low interaction between the tuned circuits as a result of the high effective "Q" of the circuits. The circuit is highly suited to narrow bandwidths where "Q" becomes an important consideration since the effective "Q's" of the tuned circuits are substantially unaffected by the source and/or load impedance.

While we have described above the principles of our invention in connection with specific apparatus, it is to be clearly understood that this description is made only by way of example and not as a limitation to the scope of our invention as set forth in the objects thereof and in the accompanying claims.

We claim:

1. A frequency discriminator comprising a signal input means, a first signal channel and a second signal channel coupled in parallel to said input means, each of said channels having a frequency rejection filter including an inductor having a tap point therealong coupled in series to the signal of said input means, a condenser coupled in parallel to said inductor and a resistor coupled to said tap point and in shunt relation to the signal of said input means, said rejection filters being resonant at different frequencies, each rejection filter operating to reject the frequency at which it is resonant, a first bridge-type rectifier coupled to the rejection filter of said first signal channel, a second bridge-type rectifier coupled to the rejection filter of said second signal channel, means to couple one output terminal of said first and second rectifiers together to provide a reference potential, a first condenser coupled between the other output terminal of said first rectifier and said reference potential and a second condenser coupled between the other output terminal of said second rectifier and said reference potential, said condenser filtering the outputs of the respective ones of said rectifiers, and a first and second load resistor coupled in parallel to said first and second condensers, respectively, to combine in opposition the outputs of said rectifiers to provide the desired frequency discrimination characteristic.

2. A frequency discriminator comprising a signal input means, a first signal channel and a second signal channel coupled in parallel to said input means, each of said channels having a frequency rejection filter including an inductor having a tap point therealong coupled in series to the signal of said input means, a condenser coupled in parallel to said inductor and a resistor coupled to said tap point and in shunt relation to the signal of said input means, said rejection filters being resonant at different frequencies, each rejection filter operating to reject the frequency at which it is resonant, and means coupled to the rejection filters of said channels to combine the outputs of said channels in opposition to provide the desired frequency discrimination characteristic.

3. A frequency discriminator comprising a signal input means, a first signal channel and a second signal channel coupled in parallel to said input means, each of said channels having a frequency rejection filter including an inductor having a tap point therealong coupled in series to the signal of said input means, a condenser coupled in parallel to said inductor and a resistor coupled to said tap point and in shunt relation to the signal of said input means, said rejection filters being resonant at different frequencies, each rejection filter operating to reject the frequency at which it is resonant, and means coupled to the rejection filters of said channels to combine the outputs of said channels in opposition to provide the desired frequency discrimination characteristic, said means to combine including a pair of bridge-type rectifiers one coupled to each of said rejection filters, one terminal of each of said rectifiers being connected together.

4. A frequency discriminator comprising a signal input means, a first signal channel and a second signal channel coupled in parallel to said input means, each of said channels having a frequency rejection filter including an inductor having a tap point therealong coupled in series to the signal of said input means, a condenser coupled in parallel to said inductor and a resistor coupled to said tap point and in shunt relation to the signal of said input means, said rejection filters being resonant at different frequencies, each rejection filter operating to reject the frequency at which it is resonant, and means coupled to the rejection filters of said channels to combine the outputs of said channels in opposition to provide the desired frequency discrimination characteristic, said means to combine including a pair of bridge-type rectifiers one coupled to each of said rejection filters, one output terminal of each of said rectifiers being connected together to provide a reference potential, a first load impedance coupled between the other output terminal of one of said rectifiers and said reference potential and a second load impedance coupled between the other output terminal of the other of said rectifiers and said reference potential.

References Cited in the file of this patent

UNITED STATES PATENTS

| | | |
|---|---|---|
| 2,243,417 | Crosby | May 27, 1941 |
| 2,374,735 | Crosby | May 1, 1945 |
| 2,524,992 | Rodhe | Oct. 10, 1950 |
| 2,712,600 | Beckwith | July 5, 1955 |
| 2,743,361 | Bauman | Apr. 24, 1956 |

FOREIGN PATENTS

| | | |
|---|---|---|
| 721,138 | Germany | May 28, 1942 |